United States Patent [19]

Policastro et al.

[11] Patent Number: 4,675,367

[45] Date of Patent: Jun. 23, 1987

[54] SILYL POLYAMIDES AND METHOD FOR THEIR PREPARATION

[75] Inventors: Peter P. Policastro, Schenectady; John E. Hallgren, Scotia, both of N.Y.

[73] Assignee: General Electric Company, Schenectady, N.Y.

[21] Appl. No.: 860,980

[22] Filed: May 8, 1986

Related U.S. Application Data

[63] Continuation-in-part of Ser. No. 645,638, Aug. 30, 1984, abandoned.

[51] Int. Cl.$^4$ .............................................. C08G 69/48
[52] U.S. Cl. .................................. 525/474; 525/431; 525/422; 528/26; 528/15
[58] Field of Search ........................ 528/26, 431, 474

[56]  References Cited

U.S. PATENT DOCUMENTS 3,723,566  3/1973  Thompson et al. ................ 260/824
4,381,396  4/1983  Ryang ................................. 549/237
4,404,350  9/1983  Ryang ................................. 528/26
4,522,985  6/1985  Ryang ................................. 525/474
4,590,243  5/1986  Gabbert et al. .................... 525/474

FOREIGN PATENT DOCUMENTS 1348783  5/1970  United Kingdom .

OTHER PUBLICATIONS

*ACS Org. Cont. Plast. Chem.*, V, 33, pp. 169–175 (1973).

Primary Examiner—Wilbert J. Briggs, Sr.
Attorney, Agent, or Firm—William H. Pittman; James C. Davis, Jr.; James Magee, Jr.

[57]  ABSTRACT

Silyl polyamides are prepared by reacting a silyl anhydride or imide, preferably a polysiloxane anhydride, with a lactam such as ε-caprolactam. The preferred materials are in the nature of A-B or A-B-A block polyamide polysiloxanes. They may be used as elastomers and adhesives or, in certain instances, in the formation of thermoset compositions.

18 Claims, No Drawings

SILYL POLYAMIDES AND METHOD FOR THEIR PREPARATION

This application is a continuation-in-part of copending application Ser. No. 645,638, filed Aug. 30, 1984, now abandoned.

This invention relates to silyl polyamides and methods for their preparation. In particular, it relates to polyamide-polysiloxane block copolymers which are useful as elastomers, adhesives and the like by reason of their combination of high elasticity and high tensile strength.

Many siloxane-based polymers are in common use as elastomers. They are typically characterized by high elongation, frequently on the order of 700–1000%, but relatively low tensile strength, often below 100 psi. Polyamides typically have entirely different properties; for example, nylon-6 is a high melting, crystalline thermoplastic with a tensile strength frequently as high as 12,000–13,000 psi. but very low elongation, often no more than about 20–30%.

It is desirable to prepare resinous materials combining the high tensile strength of polyamides with the high elongation of polysiloxanes. Such materials would be especially valuable if they also had relatively high lap shear values, since they would then have high potential for use as adhesives.

A principal object of the present invention, therefore, is to provide novel silyl polyamides and a method for their preparation.

A further object is to prepare novel polyamide polysiloxanes which combine the high tensile strength of the polyamides with the high elongation of the polysiloxanes.

A further object is to provide polyamide polysiloxanes which are useful as elastomers and adhesives.

Other objects will in part be obvious and will in part appear hereinafter.

In one of its aspects, the present invention includes silyl polyamides having the formula

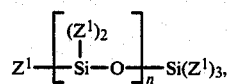  (I)

wherein:
each $Z^1$ is independently hydrogen; a polyamideimide radical having the formula

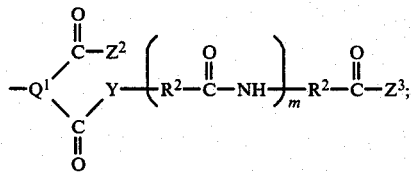  (II)

a siloxane radical having the formula

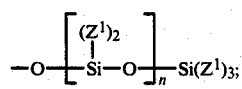  (III)

a hydrocarbon or substituted hydrocarbon radical; a $C_{1-8}$ alkoxy, alkenoxy or acyloxy radical; or a radical selected from the group consisting of hydroxy, halo, $N(R^1)_2$, cyano, amido, carbamato, imidato, isocyanato, thioisocyanato, oximato, and ureido; at least one $Z^1$ having formula II;

$R^1$ is a hydrocarbon or substituted hydrocarbon radical;

$R^2$ is a divalent aliphatic hydrocarbon or substituted hydrocarbon radical in which about 2–20 carbon atoms separate the carbonyl moiety and nitrogen atom;

$Q^1$ is an aliphatic, alicyclic or aromatic radical in which vicinal carbon atoms are bonded to the carbonyl moieties in formula II;

$Z^2$ is OM and Y is NH, or $Z^2$ and Y taken together are N;

$Z^3$ is a polyamide end group;

M is alkyl, aryl or one equivalent of a cation; and each m and n is independently from 0 to about 2,000.

As will be apparent from formula I, an essential feature of the silyl polyamides of this invention is at least one silyl group. In that formula, the value of n may be 0 or any higher figure up to about 2,000, but it is usually at least about 4 and preferably at least about 10. Thus, the preferred silyl polyamides are block polyamide polysiloxanes.

Each $Z^1$ value in formula I may independently be any of several possible moieties. These include hydrogen, hydroxy, halo and various other radicals containing polar or reactive atoms or groups. They also include hydrocarbon and substituted hydrocarbon radicals, typically containing up to about 13 carbon atoms. The hydrocarbon radicals may be aliphatic (including alkyl and alkenyl), alicyclic (saturated or unsaturated) or aromatic. Any substituents present on substituted hydrocarbon $Z^1$ values should not substantially affect the character or reactivity of the silyl polyamide; illustrative substituents are halo, hydroxy, alkoxy, acyloxy, cyano, carbalkoxy, amido and silylalkyl. Illustrative hydrocarbon and substituted hydrocarbon radicals are methyl, ethyl, 1-propyl, 2-propyl, 1-octyl, vinyl, allyl, cyclopentyl, cyclohexyl, cyclohexenyl, norbornenyl, phenyl, tolyl, naphthyl, chlorophenyl, carbethoxy, methoxyphenyl, cyanopropyl, cyanophenyl and 3-methacryloxypropyl. The preferred radicals of this type are hydrocarbon radicals, most preferably methyl and phenyl and especially methyl.

It is also possible for one or more $Z^1$ values to have formula III, wherein $Z^1$ and m are as previously defined, whereupon the polysiloxane chain is branched. In this event, it is preferred for the aggregate of all such n values to be at least about 6.

At least one $Z^1$ value, and frequently two or more, in the silyl polyamides of this invention is a radical having formula II. In that formula, $Q^1$ is an aliphatic, alicyclic or aromatic radical in which vicinal carbon atoms are bonded to the imide moiety. Thus, $Q^1$ may be derived from such dicarboxylic acids as phthalic acid, succinic acid and norbornane-2,3-dicarboxylic acid, the latter being preferred.

The radicals having formula II may be imide-linked; that is, $Z^2$ and Y together may form a nitrogen atom linking the carbonyl carbon atom to $R^2$. They may also be amic acid radicals or salts or esters thereof. That is, Y may be NH and $Z^2$ may be OM, wherein M is one equivalent of a cation such as hydrogen, sodium, potassium, calcium or ammonium, or an alkyl or aryl radical (usually containing less than 7 carbon atoms). Preferably, the radicals are imide- or amic acid-linked or a mixture of the two.

The $R^2$ value is a divalent aliphatic (usually) or aromatic hydrocarbon or substituted hydrocarbon radical, any substituents on which are subject to the same conditions set forth hereinabove with respect to $Z^1$. It is usually a hydrocarbon radical and preferably an alkylene radical. About 2-20 carbon atoms therein separate the carbonyl moiety and nitrogen atom; that is, each amide moiety contains a straight chain containing about 2-20 carbon atoms. The length of said straight chain is preferably about 4-12 carbon atoms.

Each m value in the silyl polyamide is independently from 0 to about 2,000. Usually, each m value is at least about 5.

The $Z^3$ value may be any suitable end group for a polyamide. Its structure is not critical for the purposes of this invention and will depend upon a number of factors apparent to those skilled in the art, including the catalyst used for the preparation of the silyl polyamide, the nature and purity of the reactants, and the molecular structure of any endcapping agent which may be used. One typical end group of this type, especially when the silyl polyamide is prepared from a lactam as described hereinafter, is a lactam residue of the formula

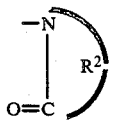

(IV)

The $Z^3$ value may also be a free substituted or unsubstituted amine group, an O-M group wherein M is as defined hereinabove, hydrogen, an alkyl or aryl group, a β-keto group or an amido group.

It is also possible for $Z^3$ to have the formula

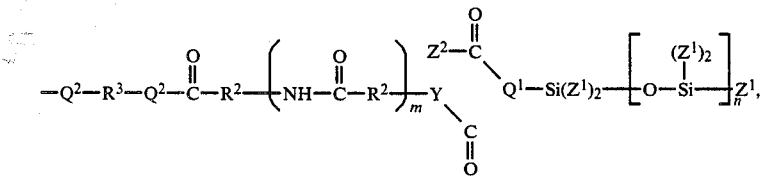

(V)

wherein each $Q^2$ is O, S or NH; $R^3$ is a hydrocarbon or substituted hydrocarbon radical, preferably a hydrocarbon radical and more preferably an alkylene radical containing about 2-8 carbon atoms; and $R^2$, $Q^1$, $Z^1$ and $Z^2$ are as previously defined. Polyamide polysiloxanes in which $Z^3$ has formula V may be characterized as $(A-B)_x$ block polymers.

A preferred embodiment of the polyamide polysiloxanes of this invention consists of those in which one or both terminal $Z^1$ groups on the polysiloxane chain have formula II and all remaining $Z^1$ groups are methyl or phenyl, especially methyl. These may be characterized as A-B or A-B-A block polymers.

Another aspect of the present invention consists of a method for preparing a silyl polyamide and the products prepared thereby. Said method comprises reacting, in the presence of a catalytic amount of at least one basic reagent, (A) at least one lactam having the formula

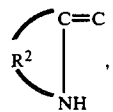

(VI)

wherein $R^2$ is as previously defined, with (B) at least one silyl dicarboxylic acid anhydride or imide having the formula

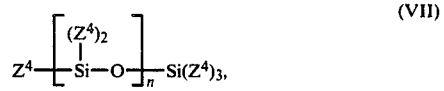

(VII)

wherein:
each $Z^4$ is independently hydrogen; a dicarboxylic acid anhydride or imide radical having the formula

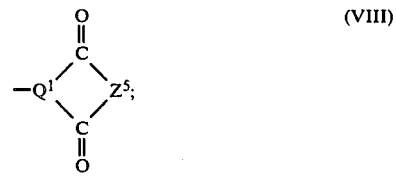

(VIII)

a siloxane radical having the formula

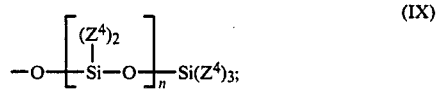

(IX)

a hydrocarbon or substituted hydrocarbon radical;

a $C_{1-8}$ alkoxy, alkenoxy, or acyloxy radical; or a radical selected from the group consisting of hydroxy, halo, $N(R^1)_2$, cyano, amido, carbamato, imidato, isocyanato, thioisocyanato, oximato and ureido;

$Q^1$ and $R^1$ are as previously defined, $Z^5$ is oxygen or $NR^4$, and $R^4$ is hydrogen or a lower alkyl or lower aryl radical; and at least one $Z^4$ having formula VIII.

The silyl dicarboxylic acid anhydrides (from which the corresponding imides may be prepared by conventional methods) used as reagent B in the method of this invention are known compounds. Reference is made, for example, to U.S. Pat. No. 4,381,396 and the references cited therein, especially the following:

U.S.S.R. Pat. No. 244,616; C.A., 72, 32777m (1970).
U.S.S.R. Pat. No. 761,521; C.A., 94, 16635n (1981).
Pratt et al, *J. Org. Chem.*, 38, 4271-4274 (1973).
Johnston et al, *ACS Org. Cont. Plast. Chem.*, 33, 169-176 (1973).

The preferred compounds are the anhydrides (especially) and imides wherein $R^4$ is an electron-deficient radical such as phenyl, and in which $Q^1$ has the formula

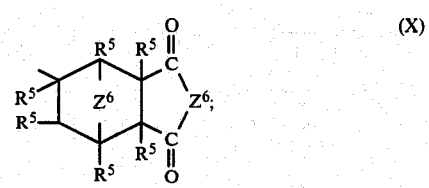

wherein $Z^6$ is oxygen or $C(R^5)_2$ and each $R^5$ is independently hydrogen, halo or a hydrocarbon or substituted hydrocarbon radical, preferably containing up to about 13 carbon atoms. Silyl dicarboxylic acid anhydrides of this type are disclosed in the aforementioned U.S. Pat. No. 4,381,396. Especially preferred are those in which each $R^5$ is hydrogen and $Z^6$ is $CH_2$.

Reagent A, the lactam, may be any one or more of a number of known lactams. Preferred are those in which $R^2$ is a straight alkylene chain containing about 4–12 carbon atoms. Illustrative lactams of this type are δ-valerolactam, ε-caprolactam and laurolactam, in which $R^2$ is $(CH_2)_4$, $(CH_2)_5$ and $(CH_2)_{11}$ respectively. ε-Caprolactam and mixtures thereof with laurolactam are especially preferred; the use of laurolactam has the effect of lowering the melting temperature of the products.

The basic reagents which may be used as catalysts include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents.

The method of this invention is typically conducted by heating a blend of reagents A and B and the catalyst at a temperature within the range of about 25°–200° C., preferably about 90°–150° C., until polymerization is complete. The reaction may be performed in a conventional chemical reaction vessel or in suitable molding or extrusion apparatus.

The ratio of equivalents of reagents B to reagent A may be varied according to the properties desired in the product. In general, products having a number ratio of amide to siloxane structural units up to about 0.5:1 behave predominantly as polysiloxanes with improved tensile strength as a result of the presence of polyamide moieties. On the other hand, products in which said ratio is above about 2:1 behave predominantly as polyamides with improved elongation attributable to the polysiloxane moieties. Products with intermediate values are characterized by combinations of properties between these extremes. The ratio of amide to siloxane units is most often from about 0.3:1 to about 4:1 and may be conveniently adjusted by employing polysiloxane reagents with known values of siloxane units as reagent B.

Typically, about 20–100 equivalents of reagent A are used per equivalent of reagent B. (The equivalent weight of a lactam of formula VI is equal to its molecular weight and the equivalent weight of a silyl dicarboxylic acid anhydride or imide is its molecular weight divided by the number of anhydride or imide groups therein.) The amount of basic catalyst is usually about 1–10 mole percent, preferably about 2–5 mole percent, based on reagent A.

It is possible to employ such diluents as tetrahydrofuran, dimethylformamide, dimethylacetamide, dimethyl sulfoxide or chlorobenzene in the reaction. When a diluent is used, the product normally separates by precipitation as it is formed. It is frequently found, however, that a principal advantage of the invention is the possibility of preparing the polymer in a diluent-free system, and that the use of a diluent is not preferred.

The silyl polyamides prepared by the above-described method comprise, for the most part, compounds having formula I. However, other molecular species may also be present therein. Therefore, the compositions of the invention are often described most completely in terms of the method for their preparation.

The preparation of the silyl polyamides of this invention is illustrated by the following examples. All parts are by weight. Molecular weights were determined by gel permeation chromatography relative to polystyrene.

EXAMPLE 1

ε-Caprolactam, 10 parts (90 meq.), was melted by heating at 140° C. Sodium hydride, 0.1 part (4.16 meq.), was added and the mixture was stirred until gas evolution ceased. There was then added 2.5 parts (2 meq.) of a bisanhydride-terminated polysiloxane having formula I wherein the terminal $X^1$ groups were 5-norbornyl-2,3-dicarboxylic anhydride groups, all remaining $X^1$ values were methyl, each a was 2, each b was 1 and n was about 24. (The properties of reactants were calculated to yield a product having a ratio of amide to siloxane units of 1.8:1). The mixture was stirred and polymerization began within one minute. When the reaction was complete, the mixture was cooled to room temperature, ground to a powder and extracted with toluene for 4 days. The product was identified by hydrogen nuclear magnetic resonance and infrared spectra and chemical analysis as the desired polysiloxane polyamide. It contained about 20% dimethylsiloxane groups and no unreacted polysiloxane dicarboxylic acid anhydride. It had a Tm of 207° C., a weight average molecular weight of 39,400 and a number average molecular weight of 13,100.

EXAMPLE 2

A mixture of 10 parts of ε-caprolactam, 0.1 part of sodium hydride and 2.5 parts of the anhydride-terminated polysiloxane of Example 1 was prepared at 110° C. and poured into a polytetrafluoroethylene mold preheated to 140° C. The mold was placed in an oven at 140° C. for 40 minutes and then cooled to room temperature. The polyamide polysiloxane was obtained as a rectangular bar having properties similar to those of the product of Example 1.

EXAMPLE 3

A mixture of 8.15 parts (72 meq.) of ε-caprolactam and 3.55 parts (18 meq.) of laurolactam was melted by heating at 130° C. Sodium hydride, 0.13 part (5.2 meq.), was added and the mixture was stirred until gas evolution ceased. There was then added 3.0 parts (2.4 meq.) of the bis-anhydride-terminated polysiloxane of Example 1. The mixture was stirred and polymerization began within one minute. When the reaction was complete, the mixture was cooled to room temperature, ground to a powder and extracted with toluene for 24 hours. The product had an intrinsic viscosity in cresol of 1.2 dl./g., a Tm of 175° C., a weight average molecular weight of 36,000 and a number average molecular weight of 21,000.

EXAMPLE 4

The procedure of Example 3 was repeated, using a mixture of 63 meq. of ε-caprolactam and 27 meq. of laurolactam. The product had an intrinsic viscosity in cresol of 0.9 dl./g. and a Tm of 151° C. Its weight and number average molecular weights were 29,000 and 20,000, respectively.

For the most part, the polyamide polysiloxanes of this invention are thermoplastic elastomers. They are useful as adhesives; particularly useful in this respect are those having at least about 35% (by weight) and especially at least about 50% siloxane groups. Compositions having higher proportions of amide moieties have the properties of siloxane-modified polyamides, as noted hereinabove.

The utility of the compositions of this invention as adhesives is illustrated by the following example.

EXAMPLE 5

Following the procedure of Example 1, a mixture of 1.5 parts (13.3 meq.) of ε-caprolactam, 0.02 part (0.8 meq.) of sodium hydride and 0.60 part (0.3 meq.) of the bis-anhydride-terminated polysiloxane was prepared. When it became homogeneous, it was poured on an aluminum plate preheated to 180° C. and a second preheated plate was applied to form a resin layer one-half inch wide and 6 mils thick. The resin layer cured within one minute to form an adhesive bond with a lap shear strength of 890 psi., as measured with an Instron Model 4902 mechanized testing apparatus.

The thermoplastic polyamide polysiloxanes of this invention may also be employed as sealants and caulking compounds. For this purpose, they may be combined with fillers and/or pigments known in the art, including titanium dioxide, zirconium silicate, silica aerogel, iron oxide, diatomaceous earth, fumed silica, carbon black, precipitated silica, glass fibers, polyvinyl chloride, ground quartz and calcium carbonate. The amounts of filler used can obviously be varied within wide limits in accordance with the intended use. For example, in some sealant applications the polyamide polysiloxanes can be used free of filler. In other applications, such as the employment of the polyamide polysiloxane compositions for making binding material, as much as 700 parts or more (by weight) of filler per 100 parts of polyamide polysiloxane can be employed. In such applications, the filler can consist of a major amount of extending materials, such as ground quartz, polyvinyl chloride, or mixtures thereof, preferably having an average particle size in the range of from about 1 to 10 microns.

It is also possible to prepare thermoset compositions of this invention. This may be done, for example, by incorporating ethylenically unsaturated (e.g., vinyl or allyl) groups as substituents on silicon or $R^2$ and crosslinking the composition by vinyl polymerization. Alternatively, silanol or hydrolyzable silane groups may be moisture-cured as disclosed in a number of U.S. patents including the following:

U.S. Pat. Nos. 4,176,111; 4,176,112; 4,223,122; 4,357,443; 4,395,526.

An especially convenient method for preparing thermoset compositions, which constitutes another aspect of this invention, comprises reacting at least one polyamide polysiloxane as described hereinabove, wherein a portion of the $X^1$ value are ethylenically unsaturated groups, with at least one hydrosilane compound, which may be a polyamide polysiloxane containing Si—H groups or another reagent (preferably containing at least two hydrosilane groups), in the presence of a hydrosilation catalyst such as those prepared by reacting a platinum compound with a vinyl-substituted polysiloxane, preferably a disiloxane. This reaction, and catalysts suitable for use therein, are disclosed in the following U.S. Pat. Nos.: 3,419,593; 3,775,452; 4,288,345. The disclosures of all of the foregoing patents are incorporated by reference herein.

What is claimed is:

1. An elastomeric silyl polyamide having the formula

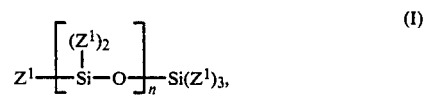

wherein:
each $Z^1$ is independently hydrogen; a polyamideimide radical having the formula

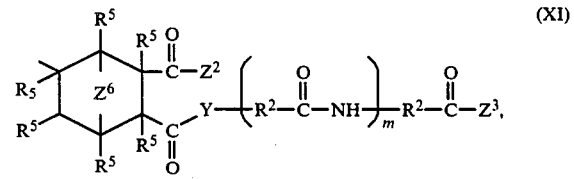

a siloxane radical having the formula

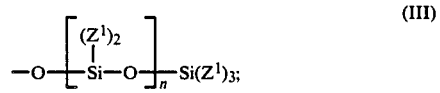

a hydrocarbon or substituted hydrocarbon radical; $C_{1-8}$ alkoxy, alkenoxy or acyloxy; or a radial selected from the group consisting of hydroxy, halo, $N(R^1)_2$, cyano, amido, carbamato, imidato, isocyanato, thioisocyanato, oximato, and ureido; at least one $Z^1$ having formula XI;

$R^1$ is a hydrocarbon or substituted hydrocarbon radical;

$R^2$ is a divalent aliphatic hydrocarbon or substituted hydrocarbon radical in which about 2–20 carbon atoms separate the carbonyl moiety and nitrogen atom;

$Z^2$ is OM and Y is NH, or $Z^2$ and Y taken together are N;

$Z^3$ is a polyamide end group;

$Z^6$ is oxygen or $C(R^5)_2$;

each $R^5$ is independently hydrogen, halo or a hydrocarbon or substituted hydrocarbon radical;

M is alkyl, aryl or one equivalent of a cation;

m is from 0 to about 2,000; and n is from 10 to about 2,000.

2. A composition according to claim 1 wherein m is at least about 5.

3. A composition according to claim 2 wherein one or both terminal $Z^1$ groups have formula XI, all remaining $Z^1$ groups are methyl or phenyl, each $R^5$ is hydrogen and $Z^6$ is $CH_2$.

4. A composition according to claim 3 wherein $R^2$ is a straight chain alkylene radical containing about 4–12 carbon atoms.

5. A composition according to claim 4 wherein $R^2$ is $(CH_2)_5$, $(CH_2)_{11}$ or a mixture thereof.

6. A composition according to claim 5 wherein both terminal $Z^1$ groups have formula XI.

7. A method for preparing a silyl polyamide which comprises reacting, in the presence of a catalytic amount of at least one basic reagent:

(A) at least one lactam having the formula

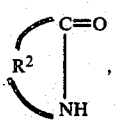 (VI)

wherein $R^2$ is a divalent aliphatic hydrocarbon or substituted hydrocarbon radical in which about 20 carbon atoms separate the carbonyl moiety and nitrogen atom; with (B) at least one silyl anhydride or imide having the formula

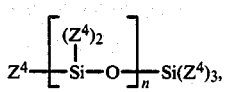 (VII)

wherein:

each $Z^4$ is independently hydrogen; a dicarboxylic acid anhydride or imide radical having the formula

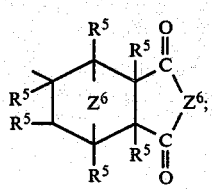 (X)

a siloxane radical having the formula

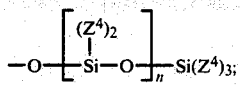 (IX)

a hydrocarbon or substituted hydrocarbon radical; $C_{1-8}$ alkoxy, alkenoxy, or acyloxy; or a radical selected from the group consisting of hydroxy, halo, $N(R^1)_2$; cyano, amido, carbamato, imidato, isocyanato, thioisocyanato, oximato and ureido;

$R^1$ is a hydrocarbon or substituted hydrocarbon radical;

$R^4$ is hydrogen or a lower alkyl or lower aryl radical;

each $R^5$ is independently hydrogen, halo or a hydrocarbon or substituted hydrocarbon radical;

$Z^6$ is oxygen or $NR^4$; and n is from 10 to about 2,000;

at least one $Z^4$ having formula X.

8. A method according to claim 7 wherein $Z^6$ is oxygen and the reaction temperature is within the range of about 90°–150° C.

9. A method according to claim 8 wherein one or both terminal $Z^4$ groups have formula X and all remaining $Z^4$ groups are methyl or phenyl.

10. A method according to claim 9 wherein $R^2$ is a straight chain alkylene radical containing about 4–12 carbon atoms.

11. A method according to claim 10 wherein $R^2$ is $(CH_2)_5$, $(CH_2)_{11}$ or a mixture thereof.

12. A method according to claim 11 wherein both terminal $Z^4$ groups have formula X.

13. A thermoplastic silyl polyamide prepared by the method of claim 7.

14. A thermoplastic silyl polyamide prepared by the method of claim 9.

15. A thermoplastic silyl polyamide prepared by the method of claim 12.

16. A method for preparing a thermoset composition which comprises reacting a silyl polyamide according to claim 1, wherein a portion of the $Z^1$ values are ethylenically unsaturated groups, with at least one hydrosilane compound in the presence of a hydrosilation catalyst.

17. A method according to claim 16 wherein the hydrosilane compound contains at least two hydrosilane groups and the hydrosilation catalyst is prepared by reacting a platinum compound with a vinyl-substituted polysiloxane.

18. A thermoset composition prepared by the method of claim 16.

* * * * *